(12) United States Patent
Le Pelerin et al.

(10) Patent No.: US 10,708,634 B2
(45) Date of Patent: Jul. 7, 2020

(54) METHOD FOR PLAYING REPEATABLE EVENTS ON A MEDIA PLAYER

(75) Inventors: Alain Le Pelerin, Renens (CH); Matthieu Piquet, Paris (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 166 days.

(21) Appl. No.: 14/128,166

(22) PCT Filed: Jun. 28, 2012

(86) PCT No.: PCT/EP2012/062628
§ 371 (c)(1),
(2), (4) Date: May 22, 2014

(87) PCT Pub. No.: WO2013/004597
PCT Pub. Date: Jan. 10, 2013

(65) Prior Publication Data
US 2014/0282713 A1 Sep. 18, 2014

Related U.S. Application Data

(60) Provisional application No. 61/508,701, filed on Jul. 18, 2011, provisional application No. 61/512,953, filed on Jul. 29, 2011.

(30) Foreign Application Priority Data

Jul. 1, 2011 (EP) .................................... 11172396
Jul. 29, 2011 (EP) .................................... 11176021

(51) Int. Cl.
*H04N 21/234* (2011.01)
*H04N 21/4405* (2011.01)
(Continued)

(52) U.S. Cl.
CPC ....... *H04N 21/234* (2013.01); *H04N 21/4405* (2013.01); *H04N 21/44016* (2013.01);
(Continued)

(58) Field of Classification Search
None
See application file for complete search history.

(56) References Cited

U.S. PATENT DOCUMENTS 4,314,285 A 2/1982 Boner et al.
5,668,917 A 9/1997 Lewine
(Continued)

FOREIGN PATENT DOCUMENTS

AU 751436 11/1999
DE 10 2005 060 288 6/2007
(Continued)

OTHER PUBLICATIONS

International Search Report issued in International Application No. PCT/EP2012/062628 dated Oct. 19, 2012.
(Continued)

*Primary Examiner* — Fernando Alcon
(74) *Attorney, Agent, or Firm* — Oblon, McClelland, Maier & Neustadt, L.L.P.

(57) ABSTRACT

The present invention is directed to playing an alternative pre-stored content in place of a particular type of content received by the player within a transport stream comprising a plurality of types of content. The invention can be useful in providing targeted advertising, where, when combined with profiling techniques, alternative content of interest to a viewer can be substituted in the transport stream in place of the received content. According to other embodiments of the present invention, computing resources and communication bandwidth use can be saved by playing pre-stored content instead of the received content. Embodiments of the present (Continued)

invention provide for the maintenance of the pre-stored material by storing appropriate content as it is received in the transport stream or by deleting pre-stored content when deemed appropriate to do so. An embodiment of the present invention may be deployed in a personal video player/recorder.

15 Claims, 3 Drawing Sheets

(51) Int. Cl.
    H04N 21/4623    (2011.01)
    H04N 21/45      (2011.01)
    H04N 21/44      (2011.01)
    H04N 21/81      (2011.01)
(52) U.S. Cl.
    CPC ..... *H04N 21/4532* (2013.01); *H04N 21/4623* (2013.01); *H04N 21/812* (2013.01)

(56) References Cited

U.S. PATENT DOCUMENTS

| | | | |
|---|---|---|---|
| 6,256,741 B1 | 7/2001 | Stubblebine | |
| 6,360,320 B1 | 3/2002 | Ishiguro et al. | |
| 6,438,690 B1 | 8/2002 | Patel et al. | |
| 6,443,361 B1 | 9/2002 | Klatt et al. | |
| 6,636,975 B1 | 10/2003 | Khidekel et al. | |
| 6,651,253 B2 | 11/2003 | Dudkiewicz et al. | |
| 6,810,527 B1 | 10/2004 | Conrad et al. | |
| 6,973,665 B2 | 12/2005 | Dudkiewicz et al. | |
| 7,039,802 B1 | 5/2006 | Eskicioglu et al. | |
| 7,146,412 B2 | 12/2006 | Turnbull | |
| 7,225,164 B1 | 5/2007 | Candelore et al. | |
| 7,245,720 B2 | 7/2007 | Wajs | |
| 7,310,732 B2 | 12/2007 | Matsuyama et al. | |
| 7,367,043 B2 | 4/2008 | Dudkiewicz et al. | |
| 7,337,462 B2 | 5/2008 | Dudkiewicz et al. | |
| 7,380,133 B2 | 5/2008 | Jaquier | |
| 7,424,613 B2 | 9/2008 | Han et al. | |
| 7,434,247 B2 | 10/2008 | Dudkiewicz et al. | |
| 7,720,351 B2 | 5/2010 | Levitan | |
| 7,895,663 B1 | 2/2011 | Van Hoff et al. | |
| 7,934,212 B2 | 4/2011 | Lakhdhir | |
| 8,028,332 B2 | 9/2011 | Le Buhan et al. | |
| 8,165,916 B2 | 4/2012 | Hofferg | |
| 8,311,125 B2* | 11/2012 | Lecomte ................ | H04N 7/165 375/240.26 |
| 8,336,106 B2 | 12/2012 | Le Buhan et al. | |
| 8,463,883 B2 | 6/2013 | Nicoulin et al. | |
| 2001/0020241 A1 | 9/2001 | Kawamoto et al. | |
| 2002/0087979 A1 | 7/2002 | Dudkiewicz et al. | |
| 2002/0087987 A1 | 7/2002 | Dudkiewicz et al. | |
| 2002/0088009 A1 | 7/2002 | Dukiewicz et al. | |
| 2002/0088010 A1 | 7/2002 | Dudkiewicz et al. | |
| 2002/0092022 A1 | 7/2002 | Dudkicwicz et al. | |
| 2002/0092031 A1 | 7/2002 | Dudkiewicz et al. | |
| 2002/0144262 A1* | 10/2002 | Plotnick et al. ................ | 725/32 |
| 2002/0162109 A1* | 10/2002 | Shteyn ............... | H04N 7/17336 725/87 |
| 2002/0168963 A1 | 11/2002 | Wajs | |
| 2003/0041127 A1 | 2/2003 | Turnbull | |
| 2003/0154378 A1 | 8/2003 | Hirano | |
| 2003/0188308 A1* | 10/2003 | Kizuka .......................... | 725/32 |
| 2003/0212810 A1* | 11/2003 | Tsusaka et al. ................ | 709/231 |
| 2004/0125959 A1 | 7/2004 | Beuque et al. | |
| 2005/0028193 A1* | 2/2005 | Candelore et al. ............. | 725/32 |
| 2005/0075986 A1 | 4/2005 | You et al. | |
| 2005/0172318 A1 | 8/2005 | Dudkiewicz et al. | |
| 2005/0209970 A1 | 9/2005 | Shiba et al. | |
| 2006/0020784 A1 | 1/2006 | Jonker et al. | |
| 2006/0075449 A1* | 4/2006 | Jagadeesan et al. .......... | 725/113 |
| 2006/0200814 A1 | 9/2006 | Kontinen et al. | |
| 2007/0061855 A1* | 3/2007 | Serita et al. .................. | 725/100 |
| 2007/0174617 A1 | 7/2007 | Carrel | |
| 2007/0256090 A1 | 11/2007 | Hiron et al. | |
| 2007/0256126 A1 | 11/2007 | Erickson et al. | |
| 2007/0294722 A1 | 12/2007 | Kang et al. | |
| 2008/0219643 A1 | 9/2008 | Le Buhan et al. | |
| 2008/0247544 A1 | 10/2008 | Candelore et al. | |
| 2009/0070754 A1 | 3/2009 | Ichikawa | |
| 2009/0113414 A1 | 4/2009 | Hamilton | |
| 2010/0217885 A1* | 8/2010 | Acharya et al. ............... | 709/231 |
| 2010/0313217 A1* | 12/2010 | Bassali et al. .................. | 725/32 |

FOREIGN PATENT DOCUMENTS

| | | |
|---|---|---|
| DE | 10 2006 016 121 | 4/2008 |
| EP | 1 078 524 | 2/2001 |
| EP | 1 111 924 | 6/2001 |
| EP | 1 326 173 | 7/2003 |
| EP | 1 624 692 | 2/2006 |
| EP | 1 811 778 | 7/2007 |
| EP | 1 914 990 | 4/2008 |
| EP | 1 968 316 | 9/2008 |
| EP | 2 026 215 | 2/2009 |
| FR | 2872662 | 1/2006 |
| WO | WO 98/56179 | 12/1998 |
| WO | WO 01/33848 | 5/2001 |
| WO | WO 02/43353 | 5/2002 |
| WO | WO 03/107589 | 12/2003 |
| WO | WO 2004/056116 | 7/2004 |
| WO | WO 2004/112004 | 12/2004 |
| WO | WO 2005/124583 | 12/2005 |
| WO | WO 2007/120892 | 10/2007 |
| WO | WO 2009/152447 | 12/2009 |

OTHER PUBLICATIONS

Written Opinion issued in International Application No. PCT/EP2012/062628 dated Oct. 19, 2012.
English language abstract of FR 2,872,662, published Jan. 6, 2006.
A. Eskicioglu et al., "An Overview of Multimedia content Protection in Consumer Electronics Devices", Signal Processing: Image Communication 16, pp. 681-699 (2001).
"Functional Model of a Conditional Access System", EBU Project Group B/CA, EBU Technical Review, pp. 64-77 (1995).
David J. Cutts, "DVB Conditional Access", Electronics and Communication Engineering Journal, pp. 21-27 (Feb. 1997).
Abstract of EP 1 811 778 published Jul. 25, 2007 with machine generated English translation.
Abstract of DE 10 2006 016 121 published Aug. 30, 2007 with machine generated English translation.
English Language Abstract of DE 10 2005 060 288 published Jun. 21, 2007.
English Language Abstact of WO 99/57901 (family member of EP 1 078 524) published Feb. 28, 2001.

* cited by examiner

METHOD FOR PLAYING REPEATABLE EVENTS ON A MEDIA PLAYER

CROSS REFERENCE TO RELATED APPLICATIONS

This application is a U.S. National Stage Application of International Application No. PCT/EP2012/062628 filed Jun. 28, 2012, which claims priority from U.S. Patent Application No. 61/508,701 filed Jul. 18, 2011 and 61/512,953 filed Jul. 29, 2011 and European Patent Application Nos. 11172396.1 filed Jul. 1, 2011 and 11176021.1 filed Jul. 29, 2011.

TECHNICAL DOMAIN

The present invention relates to the domain of the delivery of digital media to digital media players, especially digital media players comprising means for storage of media content. More particularly, it is especially applicable to a pay TV environment where the digital media is received from a distribution network in encrypted format and is viewable subject to the payment of a fee. Receiving equipment in such a domain therefore usually comprises a conditional access module (CAM) and may be of the Common Interface type. According to some embodiments, the invention is facilitated within the CAM so that the invention may be practiced on any media player configured to operate with the CAM.

STATE OF THE ART

Advertising plays an important role in the economics of entertainment programming in that the inclusion of advertisements during a broadcast can allow for the subsidising of the cost of development of at least part of the broadcast content. However, if the viewer of the broadcast does not find any interest in viewing the broadcast advertisements, he may feel inclined to skip such so-called commercial breaks by zapping from the currently viewed channel towards a different channel.

In order to discourage such zapping, it is known in the state of the art to use the conditional access module, which is generally comprised in a standard Pay-TV reception device, to store a profile for the user of the reception device, the profile recording a set of interests related to that particular viewer and to target particular advertising material to that user based on his profile.

In order to replace advertising content with targeted advertising content it is necessary to be able to detect where the advertising content to be replaced occurs within the transmission. Ways and means are known from the state of the art for detecting the presence of advertising material within a transmission and these include, for example: detecting a change in the average light intensity of the video signal; detecting a rate of change in the luminance level between two different sets of frames; detecting increased cut rate and the presence of varying size text; or detecting black level in the video signal. These types of detection techniques give an indication that a break in the programme exists, thereby suggesting a possible place where advertising material could occur. Such ways and means are described in European Patent Publication number 1149491 B1.

Another technique for identifying successive video sequences is to sense a drop in the voltage level on the input signal to below a predetermined threshold, as described in the United States Patent Application Publication number 4314285. Still another technique is disclosed in United States Patent Publication number 5668917 and consists in identifying matching images.

The techniques described above are not practical in a modern TV broadcast system since they lead to unreliable detection of advertising material. For example, a black frame may appear in the middle of a movie and this could be mistaken to indicate the start of an advertisement sequence. Furthermore, such devices and methods do not allow for particular advertising material to be targeted at particular viewers and therefore would not allow for one advertising sequence to be replaced by a targeted advertising sequence.

European Patent Application Publication 1111924A1 discloses a method for controlling the use of a programme signal comprising content slots for programme content and advertisement slots for advertising content. The invention allows for a broadcaster of programme signals to sell advertising slots within the programme signal, where the advertising slot will be filled with advertising content targeted to meet the viewer's preferences. Control of the use of the programme signal is done in the viewer's reception device, which comprises, in addition to the usual modules found in conditional access reception equipment, a storage medium to store advertising content. Indeed, the storage medium, being adapted to store hours of video, may also store the programme content. In this way, the receiver may be adapted to simulate a broadcast service, conditioned by a viewer's profile, where a continuous sequence of material is presented to the viewer depending on his profile. This document does not address how to manage the storage device, neither in terms of content type (advertising content or programme content), the pertinence of the content nor how to maintain efficient use of the storage space.

The delivery of advertising content to digital media players has been described in the prior art in the field of digital broadcasting. For example, International Patent Application Publication number WO 2009/152 447 A2 describes a method for controlling the display of advertising material along with other content on a mobile device. The method involves pre-loading advertisements on the mobile device. The advertisements are selected during playback of the other content thanks to a special tag comprising an instruction to load a particular advertising segment. The invention described in this document is targeted at solving a problem of providing targeted and high-impact advertising material for viewing on a mobile device along with content which is requested by the user of the device, since no standard previously existed for this.

In United States Patent Application Publication number US 2007/0 294 722 A1 a method is described for displaying a previously stored advertisement during a broadcast. The aim of this invention is to maximize the effect of an advertisement by selectively delivering appropriate advertisements to a particular user during a commercial time between regular programs and is particularly adapted to personal video players. Indeed according to one embodiment of the invention described herein, the displaying of a particular advertisement may be conditioned upon the particular location of the (mobile) device at a particular time. According to another embodiment it is the particular user identity which conditions which adverts are shown.

U.S. Pat. No. 6,810,527 B1 describes a system for the distribution of content for display on a reception/viewing apparatus. In this system pseudo-live content or pre-recorded content (including advertisements) can be displayed. The system is particularly adapted for the distribution of content delivered via satellite and ground-based infrastructures to passengers on commercial aircraft. Although this patent application mainly covers issues dealing with providing global coverage on an aircraft it also deals with issues concerning the management of the display of live and pre-recorded content. The invention deals with issues such as identification of which content should be delivered to which aircraft.

BRIEF SUMMARY OF THE INVENTION

An objective of the present invention is to reliably manipulate broadcast content in view of extracting at least one portion of an audio/video stream and to replace it with at least one alternative content to be displayed/played on a display or playing device, the substitution being controlled by a conditional access module. Another objective of the present invention is to further handle the content according to its nature and to suggest alternative content to subscribers in accordance with their interests. Such targeted content can be handled on the basis of several parameters pertaining to a subscriber's profile. A still further objective is to proceed with such handling without increasing the bandwidth and without the need for a return path to exist.

The invention may be realised within a system comprising a media player, a storage medium and a conditional access module (CAM). The media player may also have receiving capability to receive content from a broadcaster. According to one embodiment, the storage medium is in the media player or receiver, while according to another embodiment the storage medium is in the CAM. The storage medium is used to store at least the alternative content mentioned above, which is also referred to in this document as repeatable content or advertising content. In all embodiments the CAM exercises control over the storage medium insomuch as it is required to decrypt special control messages within the content to allow for parts of the broadcast content to be substituted during playback by content stored on the storage medium. Another aspect of the invention is the management of the storage medium, where control is made over which content gets stored on the storage medium, which content from the storage medium gets substituted at playback and at which time, which content on the storage medium gets erased and when, for example.

Although the nature of the alternative content expected in this invention is preferably advertisement, this invention is not limited to such kinds of content. Thanks to the present invention, content aggregators will be able to better target their advertisement material.

Since zapping time may be rather long due to the need to change tuner parameters or to wait until the next burst for example, the present invention allows for an alternative content, e.g. a targeted advertisement, to be displayed during the zapping. Given that viewers are frequently inclined to zap during broadcast of advertising material, such substitution is welcome since it gives a chance for the targeted advertisement to be noticed.

According to a first aspect of the present invention, there is disclosed a method for replacing a section of a broadcast content stream comprising at least one broadcast content with at least an alternative content to be displayed on a display device, the substitution being controlled by a conditional access module (CAM). The CAM processes the broadcast content with incoming control messages and outputs the processed content to an output towards the playing device. The alternative content is pre-stored in an alternative content memory of said user unit. The method comprises the steps of:

a) receiving a broadcast content and a control message associated with the broadcast content; and
b) if the control message comprises a predetermined switching information having a positive state, then outputting the pre-stored alternative content in place of the broadcast content.

According to an embodiment of the present invention, the method further comprises the step of:

c) if the control message comprises a predetermined switching information having a negative state, then outputting the streaming broadcast content.

Positive and negative states of the switching information can be defined for instance by a status respectively switched to ON or OFF.

Other embodiments will be disclosed in the following description of the invention.

The present invention also refers to a user unit for performing the above method. The method described above allows for a particular subscriber to access targeted advertising, such targeting based on some predetermined parameter or parameters, without increasing bandwidth and without requiring a backchannel, thereby allowing advertisers to mount more effective advertising campaigns. The user unit in which the method is performed may be any known apparatus for receiving broadcasts of audio/video content or for replaying recorded audio/video content as long as it comprises a conditional access module configured to process electronic control messages such as those known in the Pay-TV industry. The conditional access module may comply with a known Common Interface Standard such as CI. The solution is therefore independent of the user unit as a whole and rather depends on the conditional access module since the replacement of one content for another is triggered following reception of an electronic control message (ECM). Particular knowledge of the user unit is therefore not required in order to implement the solution.

In view of the existing prior art, there further remains a need to minimize the bandwidth used in delivering digital media content to digital media players. This is especially true in the domain of mobile or portable media players, where the efficient management of computing resources is required in order to maximize the battery life among others.

To that end, according to a further aspect, the present invention provides for a media player comprising:

a receiver to receive a digital media transmission from a server via a first channel, said digital media transmission comprising:
  consumable content comprising a plurality of events including at least a current event; and
  a piece of programme specific information;
the media player further comprising:
a decryption module;
an event memory; and
a presentation module to present at least the consumable content; said media player characterised in that in combination:
the event memory comprises at least one preloaded event being designated as a repeatable event and having a unique identifier;
the piece of programme specific information comprises an encrypted tag comprising a unique identifier of a repeatable event; and
the media player is configured to:
  present at least part of the current event;

decrypt at least the unique identifier from the encrypted tag;

retrieve at least part of the repeatable event from the event memory should the decrypted unique identifier match the unique identifier of the preloaded repeatable event or else retrieve at least part of said repeatable event from the server; and present the retrieved event.

According to particular embodiments of the present invention, the tag further comprises a flag, said flag indicating that an event immediately following the current event in the digital media transmission is the repeatable event and wherein the media player is further configured to retrieve the repeatable event in its entirety from the server. Furthermore, the encrypted tag may further comprise a flag, said flag indicating that an event following the current event in the digital media transmission is a repeatable event; and a repeat index indicating a time when the repeatable event is to be presented; and wherein the media player is further configured to retrieve the repeatable event in its entirety from the server.

According to some other embodiments of the present invention, the media player comprises a second channel to communicate with the server, said second channel being bidirectional and being configured at least for transmission of commands from the media player to the server. In other embodiments the second media channel is used for transmission of the repeatable event from the server to the media player.

According to yet a further aspect, the present invention also provides for a method for playing events on a media player comprising a receiver configured to receive a digital media transmission from a server via a first channel, said digital media transmission comprising:

consumable content comprising a plurality of events including at least a current event; and
a piece of programme specific information comprising an encrypted tag including a unique identifier of a repeatable event;

said media player comprising:
a decryption module at least to decrypt the encrypted tag;
an event memory comprising at least one preloaded event, wherein the preloaded event is designated as a repeatable event and has a unique identifier; and
a presentation module to present at least the consumable content;

said method comprising:
presenting at least part of the current event;
decrypting at least the unique identifier from the encrypted tag; retrieving at least part of the repeatable event from the event memory should the decrypted unique identifier match the unique identifier of the preloaded repeatable event or else retrieving at least part of said repeatable event from the server;
presenting the retrieved event instead of the current event; and
presenting the current event when the retrieved event has terminated.

In general terms, embodiments of the present invention provide for a method for processing a transport stream using a media player comprising:
a conditional access module;
a storage device for storing at least one alternative content; and
a presentation module to present the processed transport stream; the transport stream comprising:
content of a first type;
content of a second type; and
a piece of metadata comprising switching information associated with the content of the second type;
the method allowing for the content of the second type to be replaced by the alternative content, the method comprising:
analysing the switching information using the conditional access module to determine whether or not the switching information corresponds to the alternative content;
if the switching information corresponds to the alternative content, then replacing the content of the second type by at least part of the alternative content;
if the switching information does not correspond to the alternative content, then further processing the content of the second type.

According to another aspect of the present invention, there is provided a media player for processing a transport stream, the media player comprising:
An input for receiving a digital media transmission from a content source, the digital media transmission comprising:
content of a first type and content of a second type having a unique identifier; and
a piece of metadata associated with the content of the second type;
the media player further comprising:
a conditional access module;
a storage medium; and
a presentation module to present the processed transport stream; the media player characterised in that is configured to perform the method above.

BRIEF DESCRIPTION OF THE DRAWINGS

The present invention will be better understood thanks to the detailed description which follows and the accompanying drawings, which are given as non-limiting examples of embodiments of the invention, wherein.

DETAILED DESCRIPTION

Digital content can be delivered from a distribution centre by a digital content owner to a plurality of consumers equipped with suitable receivers/viewers, otherwise known as media players. The digital content can be moving video content, still image content, audio/video content or audio content. The types of media players associated with the different types of digital content are DVD players, TV sets, display screens, digital radios etc.

The content may be delivered according to any from a range of predetermined norms or protocols for digital media file transmission or storage. More specifically, in the case where the content is audio/video content, the media files may be delivered as part of a transport stream via a broadcast network or via a network of point-to-point connections.

Examples of such connections are cable connections, IP connections, wireless broadcast networks or satellite broadcast networks.

Figure 1:
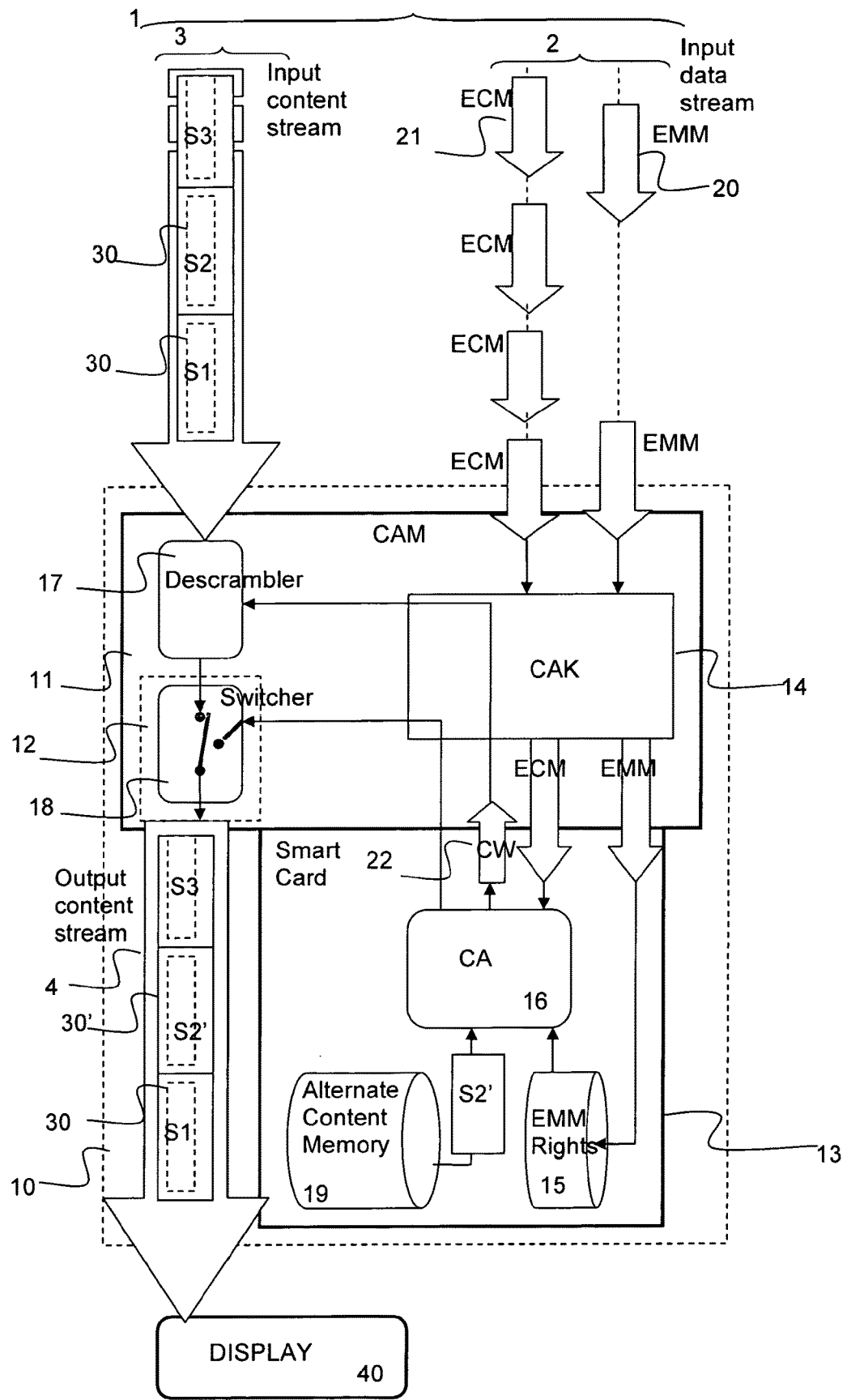
FIG. 1 shows a diagram illustrating the processing of a transport stream within a user unit, then outputting the content stream towards a playing device such as a display.

FIG. 1 shows a diagram illustrating a system for processing a transport stream 1 within a user unit 10 before playing the output content stream 4 on a playing device or display device 40, otherwise known as a presentation module. By transport stream 1 it is meant a collection of packets delivered over a physical transport channel to the user unit 10 such as a set-top-box for instance. The user unit comprises a conditional access module 11 and a smart card 13, as shown in FIG. 1. The smart card may be removable from the user unit.

Schematically, the transport stream 1 comprises numerous data packets 20, 21, 30 of several kinds which are sent in a continuous flow. These packets make up streams which can be separated into two main types, namely an access conditions stream 2 and a content stream 3; both of these streams are input streams, which in reality are usually mixed together.

Within a digital pay television system or similar, the content stream comprises the events (i.e. a series of broadcast sections S1, S2, S3, etc with start and end dates/times) under the form of a stream of audio/video packets. This stream is generally encrypted in order to provide a restricted access. However, some events, such as advertisements or free broadcasts, are not necessarily scrambled.

On the other hand, the access conditions stream 2 comprises information packets which are used to manage the content stream 3. Among these information packets we note the Entitlement Management Messages (EMM) 20 and control messages which typically are Entitlement Control Message (ECM) 21.

The EMM is a conditional access message sent by the Headend (e.g. the subscriber management system of the content provider) to the smart card 13 in order to set, reset or change access entitlements to certain products (broadcast content). The ECM is another conditional access message comprising the Access Conditions of the current broadcast event and the Control Word (CW) 22 used to unscramble the encrypted input stream.

Briefly, the principle of the Conditional Access Module (CAM) 11 is to receive the entire encrypted transport stream 1 and to return the descrambled content within the output content stream 4. To this end, the CAM 11 comprises a Conditional Access Kernel (CAK) 14 which is a software running as an interface to the smart card 13 for processing the EMMs 20 and ECMs 21. Incoming EMMs 20 are processed by the CAK for storing the entitlements of the user into the EMM Rights data base 15. The first step of the process applied to incoming EOMs is to read a marker 26 attached to each ECM. Such a marker can be compared to an identification number, which may either be the same from ECM to ECM or which may change from ECM to ECM, such change generally occurring in a regular fashion. The next step is to compare the Access Conditions AC conveyed by the ECM with the entitlements stored in the data base 15 of the smart card 13. In case of matching, it means that the user has the necessary access rights and the smart card 13 extracts at least one CW 22 from the ECM 21 and sends it back to the CAK 14. This extraction is achieved by the Conditional Access unit (CA) 16 of the smart card 13. Then, the CAK 14 forwards this CW 22 to the descrambler 17 which will be able to decrypt the scrambled input content stream 3 for outputting a descrambled output content stream 4 which is finally displayable on the display device 40.

The portion of the content stream 3 shown in FIG. 1 comprises several successive sections S1, S2, S3 of at least one broadcast content stream 3, arranged one after the other. According to a preferred embodiment of the present invention, when a substitutable content 30 is broadcast in the live stream, or in the otherwise input content stream 3, it's suitability for being substituted may be indicated by a special field in the ECM 21. Depending on information comprised in this special field, a switching unit 18 may be activated to allow the substitution of at least one of these sections for another one comprising at least an alternative content 30'. The FIG. 1 shows that the section S2 has been properly substituted for the section S2' without the end user necessarily realising that this substitution has taken place. For the purpose of making the substitution at least one alternative content 30' has been previously stored in the user unit 10, in the present case in an alternative content memory 19 of the smart card 13. According to the embodiment, the execution of the substituting of pre-stored alternative contents is controlled by the ECM. According to different embodiments of the present invention, the previous storing may be done in one of several ways, which will be described later when dealing with the management of the storage medium where the alternative content is stored. In the embodiment described above, the storage medium is an alternative content memory of the smart card for example. The management of the storage medium, as will be seen, includes the selection of content to be stored, the selection of content to be presented and the selection and deletion of content no longer deemed to be of interest.

As is generally known in the domain of pay TV systems, it is normal for ECMs to be processed by a conditional access module since information comprised within the ECM is preferably encrypted, especially control words. Likewise, according to embodiments of the present invention, the switching information within the special field of the ECM mentioned herein may be encrypted. In all cases, analysis of the ECM is carried out using the conditional access module (DECR, CA).

According to FIG. 1, the substitution of the section of content is achieved by the switching unit 18 (switcher). However, this substitution could be carried out by another means, such as means for extracting the section (e.g. S2), then means for substituting it for an alternative section (S2'). Furthermore, the switching unit 18 need not necessarily be placed in the CAM 11 after the descrambler as shown in FIG. 1, but rather may be placed at some other convenient point for the same purpose.

Depending on the type of connection that exists between a particular consumer or user and the content owner, the amount of bandwidth available for such delivery of content may be more or less limited. The protocols for transmitting digital media files involve the inclusion into the media files or transport stream of data over and above the actual consumable content i.e. the content that the viewer or listener will actually see or hear, or more generally, consume. This means that there is a certain amount of overhead involved in the transmission of digital content. Furthermore, in a situation where the content owner perceives a fee from the viewers of his content, which is very often the case for example in a pay TV environment, there will be even more overhead in the transmission since the content is generally encrypted. The protocols used for this generally end up being even more bandwidth-hungry because of the provisions which have to be made for transmitting rights and cryptographic keys and the like associated with ensuring the security of the encrypted content. This can all add up to rather high demands on precious bandwidth.

As well as being bandwidth-hungry from a communication point of view, the amount of computing power necessary to process the encrypted content is also significant. This means that the computing resources on the media player may become overly solicited. Furthermore, this increased use of computer resources may also result in higher power consumption, which may become problematic in the case where the media player is of a portable or mobile type, where battery lifetime becomes an important issue. Added to this, there is a need to allow for an advertiser, for example, to be able to intervene during a broadcast, by proposing content which will be of particular interest to a particular viewer, preferably at a particular time. Furthermore, it is desirable to be able to efficiently manage the proposed content in such a way that its relevance is maintained with time and the storage space that it occupies is optimised.

Embodiments of the present invention may be deployed in media players for example, in order to alleviate the demands on bandwidth and demands on use of computing resources by such a device as well as satisfying the need for content owners to attractively propose the sale of customisable advertising slots within their programmes. According to these embodiments of the present invention, beneficial impact on bandwidth and computer resources can be achieved through judicious management of so called repeatable content. An example of repeatable content is advertising content, which may be replayed a number of times by the media player.

Figure 2:
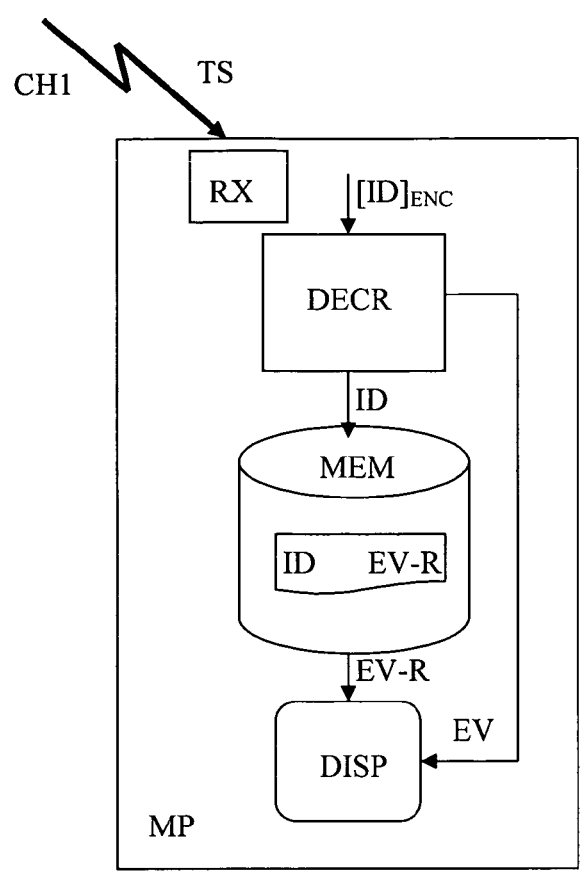
FIG. 2 shows a schematic representation of a system within which an embodiment of the present invention may be deployed.

According to another embodiment of the present invention, of which a representation is schematised in FIG. 2, a media player (MP) such as digital television unit comprises a receiver (RX), an event memory (MEM) or storage medium, a decryption unit (DECR) and a presentation module in the form of a display (DISP) on which to present the digital media. Other examples of presentation modules include a loudspeaker in the case where the invention is applied to a digital radio broadcast environment. It is worth mentioning that a decryption unit, according to the present invention, may take the form of a conditional access module (CAM) cooperating with a security module or smart card, as is generally known in the pay TV domain. The event memory (MEM) is configured to store at least events which are deemed to be repeatable events (EV-R). Events (EV) in the context of the present invention are films, sports games, quiz shows, sit-coms, advertisements, comedy shows, documentaries etc. and as such, storage of an event (EV) means memorising the digital content related to that event (EV). In the domain of digital TV for example, digital media data is transmitted in a transport stream (TS) comprising consumable content and meta data including error correction data, encryption related data and other meta data such as programme specific information (see below). The consumable content can include a plurality of different events.

Repeatable events (EV-R) are events (EV) which are susceptible to be broadcast more than once, such as an advertisement event for example. Accordingly, the event memory (MEM) of a media player which is offered for sale may be pre-loaded with at least one such repeatable event (EV-R). Alternatively, or in combination, repeatable events may be added to the storage medium or event memory during the use of the media player, where selected events from a broadcast are stored or played and stored. A unique identifier (ID) corresponding to the repeatable event (EV-R) is also stored in the media player (RX) along with the repeatable event (EV-R) in order that the repeatable event (EV-R) may be called or otherwise referenced. Selected events may also be removed from the event memory, as will be discussed below.

Events are broadcast or otherwise transmitted by the content owner (SVR) as broadcast content comprising programmed events (EV). The programmed events (EV) may be encrypted and broadcast according to techniques generally known in the art, as part of a data flow or transport stream (TS) for example or in more general terms as part of a digital media file. The transport stream (TS) further comprises programme specific information such as an Event Information Table (EIT). The EIT is used in an MPEG transport stream to provide programme data specific to the current event and for future events, including the event title, the start time, the duration, a description of the event, age rating etc. According to the embodiment of the invention, the EIT further comprises an encrypted piece of information comprising the unique ID of a repeatable event. This piece of information will be referred to as an encrypted tag.

As described above, according to this embodiment of the present invention, the transport stream includes content comprising a programmed event and further includes programme specific information such as the EIT, which comprises the unique ID of a repeatable event, the unique ID being in encrypted format, referred to above as an encrypted tag. The receiver may thereby check whether or not the referenced repeatable event is already stored in its event memory, since the repeatable event is stored along with its unique ID.

Upon detection of the encrypted tag, the media player decrypts the encrypted tag to get the unique ID of the repeatable event. The media player then checks whether the repeatable event referenced by the unique ID is already pre-stored in its event memory. If so, then the referenced repeatable event is played, from the event memory, on the media device at the programmed time (since the EIT includes such information corresponding to the encrypted tag). In this way processing resources and bandwidth can be freed up. The freed resources can then of course be utilized for some other purpose as necessary. After the repeatable event has been played the media device then returns to playing the programmed events according to the programme, which may be described in the EIT. If the repeatable event referenced by the unique ID is not present in the event memory, then the media player fetches the repeatable event from the content owner and plays it. By fetch it is meant that the media player downloads the event from the server and stores it in its event memory. By fetching the event in this manner the player need not download the same event again should it be referenced in the future. According to one embodiment the download is done via the same channel upon which all broadcast events are received. In this case the absence of the referenced event in the event memory signals the receiver to proceed with the download from the broadcast channel. According to a different embodiment, the download is achieved via a channel which is not the same channel upon which events are broadcast but rather a separate channel upon which the media receives the repeatable event. In this case, upon detection that the referenced event is absent from the event memory the receiver the download of the missing event on the separate channel. The separate channel is generally a bidirectional channel and as such the request and the missing repeatable event can be transmitted via this channel. The broadcast channel on the other hand is generally unidirectional although in some cases (IP connection for example) the broadcast channel can be bidirectional. If the media player, or any module within the media player, has to make a request for the missing event, then it is possible for the server to authenticate the player by using techniques generally known in the industry. If the event needs to be encrypted, then the server can transmit the requested file in a format encrypted for the media player in question using techniques generally known in the industry. Once the repeatable event has been played, the media player generally tunes back to the broadcast channel and continues playing the broadcast event. During the time that the repeatable event was playing the broadcast content could be held so that a return to the broadcast causing no loss in continuity of the content. In this case there would be a buffer, either at the receiver or at the broadcaster, to hold the content while the repeatable content is playing. On the other hand, the resumption of playing of the current event would continue at some point ahead of the point where the substitution of the repeatable event was made, resulting in some loss of continuity of the current event.

It can be seen then that according to embodiments of the present invention, when a repeatable event is encountered within the received transport stream a check is made to see if that repeatable event is already stored in the storage medium. If it is, then instead of playing the repeatable event from the transport stream an alternative copy is played, i.e. the one stored in the storage device. For this reason the events stored on the storage device are referred to as alternative content in the context of the present invention. It will be seen later, when other embodiments of the present invention are described, that rather than playing a stored version of the same repeatable content as it is received on the transport stream, the selected alternative content may be different from the received repeatable content, preferably being of the same category or sharing some other characteristic which will allow for the alternative content to be used to replace the received repeatable event.

In more general terms, the programmed events may be referred to as a first type of content, while the repeatable events may be referred to as a second type of content. Alternative content is therefore content of the second type, by virtue of the fact that it may be used to replace content of the second type.

An embodiment of the present invention may also be deployed in a system where digital content is requested rather than in the above example where events are broadcast according to a predetermined programme. This is the case in systems known as Video on Demand (VOD). In this type of system, when an event is requested, the content owner transmits the requested event, usually in encrypted format, to the media player. The transmitted transport stream comprises the requested event, usually in encrypted format but not necessarily so, and the EIT, which comprises the encrypted tag with the unique ID of the next repeatable event and an index indicating the end of the repeatable event. The media player decrypts and plays the requested event thereby playing it at the requested time and then decrypts the tag to get the unique ID of the repeatable event. The player then searches for the unique ID in the event library and, if present, plays the corresponding repeatable event at the start time indicated by the EIT. After the time indicated by the index has elapsed, the player then continues playing the requested event from the point where it was interrupted. Again, if the unique ID is not found in the event library, then the player fetches the event from the content owner's server, plays it at the appropriate time and stores it for future reference in the event memory.

A device or system in which an embodiment of the present invention is deployed therefore allows for the media player's resources or the communication channel resources to be freed up for use by other tasks if necessary or simply to save power.

It is worth noting at this point that since embodiments of the present invention are adapted to work in a context where content is broadcast from a broadcaster to a plurality of receivers while other embodiments are adapted to work in a VOD context, where a particular content is requested from a server or even from a CD or any other suitable content storage means, it is convenient to use the generalised name "content source" to mean the broadcaster or the server or the like.

According to the invention, the notion of a "repeatable event", which was used above to describe advertisement material, may be extended to cover other events susceptible to being re-broadcast such as a classic film or a re-run of an already broadcast sporting event. In this case the repeatable event is considerably longer and comprises significantly more data than in the case where the repeatable event is an advertisement. Accordingly, at the time of manufacture or at a point of sale of a media player, the event memory of the media player is pre-loaded with one or more events having been identified as being susceptible to be broadcast more than once. A unique identifier corresponding to such a repeatable event is also stored in the media player in order that the repeatable event may be called or otherwise referenced. Consequently a player, in which an embodiment of the present invention is deployed, will be able to recognise, by looking at the EIT, that a future broadcast of a particular film for example is a repeatable event. Such a player will therefore be able to take advantage of the bandwidth savings and power savings afforded by the implementation of the invention by playing a preloaded version of the film if it exists in its event memory. If the film does not exist in the event memory, then it will be loaded into the event memory while the event is being played, thus making it available for re-play from the event memory should an encrypted tag with the event's unique ID be later detected in the EIT.

As mentioned above, the event information table in an MPEG transport stream (EIT) comprises information specific to future events and for the current event. According to another embodiment of the present invention the EIT comprises the encrypted tag described above, comprising the unique ID of an event to be broadcast in the future. Looking closer at this encrypted tag, it may be described as having two parts: a first part comprising an indication as to whether or not the next event to be broadcast is a repeatable event and a second part comprising the unique ID of that event. The first part can be in the form of a flag indicating whether or not the next event is a repeatable event. For example, the first part, next_is_repeatable_event is a flag which can be set to TRUE or FALSE depending on whether or not the next event is a repeatable event and the second part, EventId is the unique ID of that event.

In more general terms, it can be said that the encrypted tag may comprise information more generally related to an event to be broadcast in the future. Instead of having a flag called next_is_repeatable_event, the encrypted tag has a flag called future_is_repeatable_event. In this case the tag has three parts: a first part comprising the flag future_is_repeatable_event, which can be set to TRUE or FALSE, a second part, EventId, comprising the unique ID of the referenced future event and a third part, future_event_time, comprising an indication allowing for the time of broadcast of the referenced future event to be determined. Such an indication could be an absolute time or an offset time to be used in combination with a reference time to calculate the time of broadcast.

An embodiment of the present invention allows for the implementation of another feature which is particularly useful should the repeatable event be a film for example. In this embodiment the EIT comprises an encrypted further piece of information, referred to as an encrypted further tag. This further tag comprises information relative to the currently broadcast event. Again, this further tag has two parts: a first part comprising an indication of whether or not the currently broadcast event is a repeatable event and a second part comprising the unique ID of the event currently being broadcast. The first part can be in the form of a flag indicating whether or not the event is a repeatable event. For example, the first part, current_is_repeatable_event is a flag which can be set to TRUE or FALSE depending on whether or not the current event is a repeatable event and the second part, EventId is the unique ID of the current event.

Consequently, in this embodiment of the present invention, if a viewer tunes to a service which is about to broadcast a film and that film has been identified by the service operator as being a repeatable event, then the viewer's equipment will be able to detect the TRUE status of the flag next_is_repeatable_event and the event's corresponding EventId. Or if the film is repeatable and is to be broadcast at some other time in the future, then the TRUE status of the future_is_repeatable flag will be detected and the programmed broadcast time will be determined. The event memory will be searched for the corresponding EventId and if it exists, then it will be retrieved and played at the broadcast time of the event having that unique ID instead of playing the version being broadcast. If the event does not exist in the event memory, then it will be played from the broadcast and stored in the event memory for future use.

On the other hand, if the viewer tunes to a service which is already broadcasting a film which has been identified as repeatable, then the viewer's apparatus will be able to detect the TRUE status of the flag current_is_repeatable. Thanks to the associated EventID the event memory can be searched. If an event with that unique ID exists in the event memory, then it is played from the event memory rather than from the broadcast. In this case the viewer will be given the choice of playing the event in its entirety from the beginning since it is stored in the event memory or playing the event from the same place as it is being broadcast. In the case that the viewer chooses to view the complete event from the beginning, then the viewer's apparatus will indicate, on the display for example, that the event currently playing is being played from the event memory and is not synchronised with the version of the event being broadcast. This information is available to the device by virtue of the fact that the flag current_is_repeatable is TRUE AND the viewer has chosen to retrieve the current event from the event memory. The device can therefore display "PLAYBACK" for example.

If the event having the unique ID corresponding to the EventId associated with a TRUE current_is_repeatable flag is not present in the event memory, then it is stored in the event memory from the current position. It follows then that a preceding portion of the event will be missing. Since the viewer's apparatus knows that the event having the unique ID corresponding to the EventId of a TRUE current_is_repeatable is being stored in the event memory, it can store a command to re-record the event in its entirety the next time that same EventId is detected as a next_is_repeatable or future_is_repeatable. Conversely, the apparatus may be programmed to prepend the partially stored event with the missing portion the next time it is broadcast. To do this, the player keeps track of the time corresponding to the current position mentioned above. The next time the event with the same EventId is broadcast the viewer's apparatus stores the missing complement of the event up to the time corresponding to said current position. In embodiments of the present invention where the media player is connected to the server via at least a bidirectional communication channel, the media player can simply request the server to transmit the repeatable event in its entirety. In this way the media player does not have to wait for the current event to be played again in order to receive it in its entirety.

According to some of the embodiments of the present invention described above, if the user/viewer changes channel, then playing and/or recording of the repeatable event is aborted.

Instead of using the EIT to determine whether or not a repeatable event (and thereby an event susceptible to being replaced) is playing or will be played at some point in the future as described in the above embodiments of the present invention, further embodiments exist in which any of the methods described below, which use specially adapted entitlement control messages (ECM) to identify repeatable or replaceable events, can be combined with any of the above embodiments. In these further embodiments it is the switching information, as described with reference to FIG. 3, which controls when content is to be replaced and which content should be used to replace it. Both EIT and ECM may be referred to as metadata since they carry information related to the content (data) rather than carrying content itself. The term metadata will therefore be used to cover the EIT with its encrypted tags and flags or the ECM with its switching information and marker.

Furthermore, any of the techniques described below using user profiles or preferences to determine which content should be used as a replacement can be applied, either when using the ECM's switching information or the EIT information. Similarly, such techniques may also be used in a process where broadcast content is filtered with a view to deciding which content should be stored in the storage medium and/or which content may be deleted from the storage medium. This will be further discussed below.

All of the embodiments described above involve the use of a decryption module. It is worth noting then that a system in which an embodiment of the present invention may be deployed may comprise a removable conditional access module, the function of which is to store access rights and encryption/decryption keys used in the encryption/decryption scheme in operation within the system. Any of the known conditional access modules such as the Common Interface type, for example may, be used. This goes also for the embodiments of the invention described below which use a decryption module. Using a conditional access module allows for such features as user profiles and other personalisation features to be used.

The ability to economize on communication bandwidth and on computing resources and thereby power consumption in a media device in which an embodiment of the present invention is deployed, is achieved thanks to appropriate management of the repeatable events stored or pre-stored in the event memory. According to the invention since the unique ID of the repeatable event is in encrypted format, only media players which are authorised to decrypt the tags in the EIT comprising the unique ID will be able to take advantage of the system and to enjoy the benefits thus rendered achievable. In practice, repeatable events are likely to occur in the form of advertising material. It is sometimes sought by malicious users to skip over advertising material and therefore the fact that the tags are encrypted precludes such a malicious user from being able to reconfigure a media player to simply skip over the repeatable events.

As mentioned above, the EIT comprises an encrypted piece of information comprising the unique ID of a repeatable event. This is called the encrypted tag. Also, as previously mentioned, only media players adapted to decrypt the tags will be able to provide the advantages afforded by the present invention. These two features taken together allow the user who is equipped with such an adapted media player to be able to enjoy savings in bandwidth, resources and energy by playing repeatable events from local memory. Furthermore, it is known that certain viewers may prefer to skip over advertising material, this being to the detriment of the advertiser. If such a user were to be able to take advantage of the knowledge that an advert is scheduled to be played, then he could take preemptive action and attempt to skip the advertising material. The invention therefore provides an advantage to the advertiser in that it prevents such a user from accessing such knowledge thanks to the synergistic effect of having the unique identifier of the repeatable event in the EIT and having the tag appear only in encrypted form so that the user cannot detect it and use it to inform him that he should take action to skip the event.

Figure 3:
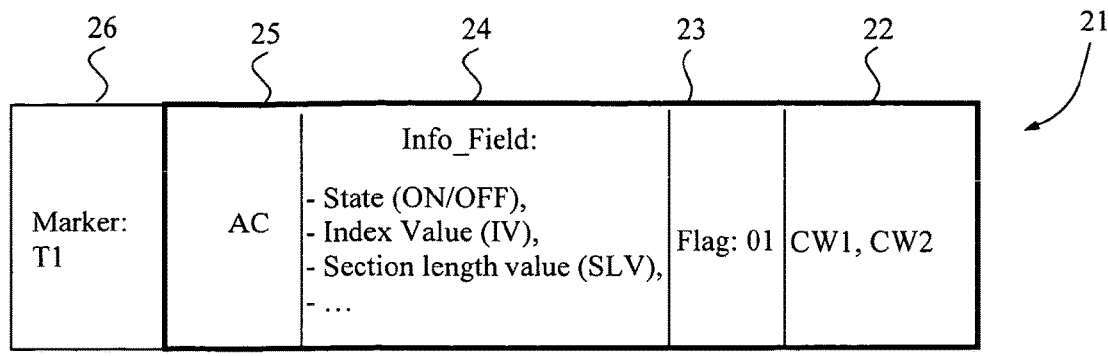
FIG. 3 shows a schematic illustration of an entitlement control message ECM.

FIG. 3 illustrates a schematic diagram of the main fields or elements comprised in an entitlement control message (ECM) 21 and which is generally known in the state of the art. As already mentioned, the ECM 21 carries the control words CW which are used by the descrambler unit of FIG. 1 to decrypt the scrambled input signal. The encryption of this signal changes periodically to prevent hacking. The time during which the same CW can be used defines a cryptoperiod P (see FIG. 4) which may typically last for a few seconds, for instance 10 seconds. In order to raise the efficiency of the system, each ECM carries two Control Words 22, which are identified by the acronyms CW1 and CW2 in FIG. 3. One of these CWs is used to decrypt the input signal during the current cryptoperiod, whereas the other CW will be used for the next cryptoperiod. To know which CW has to be used, the ECM includes a flag 23 of two bits. The value of this flag is either 00, 01 or 10, which respectively means that no CW are required (e.g. in case of free access), the first control word CW1 must be used, the second control word CW2 must be used for descrambling the input stream. On the other hand the broadcast content 30 also comprises a field comprising such a flag to know which Control Word (CW1, CW2) has to be used to decrypt this content.

According to yet other embodiments of the present invention, the ECM 21 further includes information data comprising at least switching information 24 which, in a preferred embodiment of the invention, corresponds to the special field used to announce the arrival or the presence of a content section to replace with an alternative content. This switching information can be represented as a data field in which useful information is included to perform the substitution of a section for another that provides an alternative content.

Each ECM comprises an Access Conditions field (AC) 25 comprising the Access Conditions of the broadcast channels or events corresponding to the entitlement profile of the user.

Each ECM further comprises a marker 26 which usually does not change during a same cryptoperiod P. Thus, all the ECMs belonging to a same cryptoperiod usually have the same marker. In known systems, once an ECM has been read, all the ECMs having the same marker are moved apart without being read given that the CWs are the same during a same cryptoperiod.

In order to process with the substitution of contents, the method of the present invention comprises the following steps:
 a) receiving a broadcast content 30 and a control message 21 associated to said broadcast content 30;
 b) checking if this control message 21 comprises a switching information 24 and, in positive event, checking if said switching information 24 has a positive characteristic, in positive event: switching the streaming of said broadcast content 30 to the pre-stored alternative content 30'.

The method further comprises the step of checking if at least one further control message 22 comprises said switching information 24 and, in positive event, checking if said switching information 24 has a negative characteristic, in positive event: outputting, to an output 12, the broadcast content stream 3 after descrambling if any. Compared to the previous step, this last step allows the conditional access system to return to its usual mode.

There are different manners in which the positive and negative characteristic of the switching information 24 may be defined. The first manner is to assign to this switching information a state which can be changed between one of at least two statuses, namely ON or 1 for a positive status and OFF or 0 for a negative status. It should be noted that this information is not limited to a binary state.

In another manner, a counter can be used and the characteristic of the switching information 24 could be recognised as being positive if the counter reaches a first threshold value (e.g. zero) and negative if it reaches a second threshold value (e.g. either above or below zero).

This counter could be located in the system implementing the present method so as to operate independently and could be loaded with an initialising value before its triggering. To this end, such a value may be an index value comprised in the switching information 24.

Alternatively, the index value carried by the switching information may be used as a current value of a virtual counter. This is made possible owing to the high rate of the ECM flow in the access conditions stream 2. By increasing/decreasing, in a constant manner and at regular interval, the index value within the switching information field of the next control messages (ECM), the reading of this index value will be the same as the reading of a real counter.

By this means, the switching information 24 may comprise a time indicator which indicates to the CAM that the alternative content 30' will start in n seconds, or that this alternative content shall be immediately played or will stop in n seconds.

Further, the switching information 24 may comprise a section length value which defines the size of the section to substitute, or its duration depending on the type of unit on which the system is based. The index value and/or the section length value could refer to time values or to other kind of values such as pulses. In the same way, the content may comprise a content information field providing the content length value to define the size or duration of the content. As a variant, this information field could be comprised within the ECM in the cases of this content is identified with a personal identifier and this information field is associated to this personal identifier.

Figure 4:
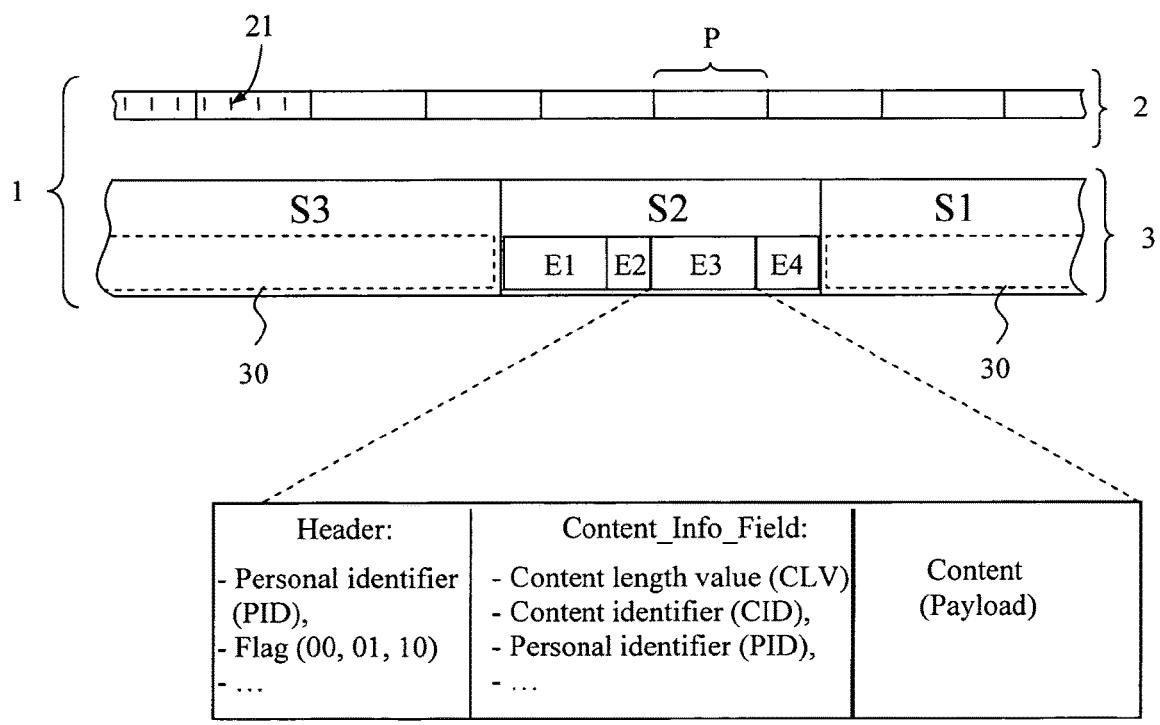
FIG. 4 shows a simplified representation of a schematic transport stream

FIG. 4 discloses a schematic representation of a simplified transport stream 1 which firstly shows that there is no synchronization between the cryptoperiods P or the flow of ECMs 21 and the sections S1, S2, S3. There is no more synchronization between the ECMs and the cryptoperiods P. Each section S1, S2, S3 may comprise one or several contents (i.e. events), represented in this figure by the boxes E1, E2, E3, E4. Another manner to announce the beginning of a new content 30 is to voluntarily change the marker 26 of the ECM 21 which is closest to this content (whatever its position within the cryptoperiod) in order to require, in particular, the processing of the switching information 24 of this ECM by the CAK 14. Still another manner to announce the arrival of a new content is to use the data code of the flag 23 of the ECM. For instance, a flag with a 00 or 11 value could be used to announce the coming of a new content such as advertising content, respectively non-advertising content. Indeed, any of the embodiments described herein may be combined with this means for detecting a transition between a current event and a repeatable event and vice versa (i.e. broadcast content to alternative content and vice versa).

In more general terms, any events which do not correspond to an ECM having switching information may be referred to as a first type of content, while any events which do correspond to an ECM having switching information may be referred to as a second type of content. Alternative content is therefore content of the second type, by virtue of the fact that it may be used to replace content of the second type.

As illustrated in FIG. 4 with reference to the event E3, each content has an architecture defining at least a header and a payload field. Typically, the header comprises at least the personal identifier of the payload and the flag indicating which Control Word (CW1 or CW2) has to be used to decrypt the present content. The payload field comprises at least a portion of the content, e.g. the event to be broadcast. Such a content E3 may further comprise an information field comprising information about the event.

According to a preferred embodiment, each of these contents (i.e. the broadcast content 30 of the input stream 3 and the alternative content 30' of the alternative content memory 19) is associated with a content identifier which allows at least a classification of these contents according to their nature (i.e. the type or kind of the content). By this means, it becomes possible to sort these contents in view to target the events to be played and/or contents that must be pre-stored in the alternative content memory 19. Although the alternative contents 30' could be stored sequentially in a carousel within the alternative content memory, it is more efficient to sort the contents during the input in the alternative content memory, rather than during the output. Thus, an alternative section (e.g. the section S2' of FIG. 1) comprising specific contents 30' will be created to substitute the corresponding regular section (i.e. the section S2 of FIG. 1) of the input content stream 3. The alternative contents can be defined as being specific, or targeted, whether it matches with the interests of the viewer. The content identifier could be included either in the content information field or within the switching information 24 of the control message 21.

It is convenient to use the term storage medium to cover both the alternative content memory according to some embodiments of the present invention and the event memory according to other embodiments of the present invention.

To avoid that a same alternative content is displayed several times within a too short time interval or to avoid storing of a content which already exists in the alternative content memory 19, each content 30, 30' will be preferably identified with a unique personal identifier, located for example in its header. By this means, each content can be selected not only on the basis of its nature but also according to its personal identifier.

The selection of targeted contents can be made in accordance with a user profile recording at least one preferred nature and/or at least one preferred content personal identifier. Such a profile can be stored for instance in a user memory of the user unit and updated, for instance by using at least one EMM if required.

The pre-storing of alternative contents can be made either in live, from the broadcast content stream, or in a hidden stream, from at least a portion (packet) of the broadcast content stream 3 which is not outputted to the display device 40.

Any of the embodiments described herein may be combined with the mentioned profiling techniques, whether the embodiment uses the ECM or the EIT to control switching between broadcast content and stored content. The profiles can be used as a basis for management of the stored content i.e. to decide which content should be stored, which content should be used as alternative content at any given time and which content should be erased from the storage medium. Indeed, any of the known means may be used to build a profile, either based on a viewer's responses to given prompts or based on automated means for determining the viewer's likes and dislikes. For example, during broadcast of a particular content, the viewer could be prompted to communicate a simple "like" or "dislike" evaluation of what he is watching by ticking a box or otherwise responding to a suitable prompt. Subsequent analysis of a series of such responses may lead to determination of a profile for that viewer, indicating his particular tastes, useful in deciding which content would be of interest to him. Such profiles may evolve over time and may therefore be updated over time. A record of an evolving profile over a cyclic period may be kept. For example, a viewer's tastes may also on the time of day or day of the week, with a tendency towards informative content just after dinner time for example or towards sport on weekends and so on. Rather than building up a profile by having the viewer respond to prompts, an automatic profile-building process may be employed whereby automatic monitoring of a special content identifier in the ECM, allowing to evaluate a content type or genre, or a piece of information within the EIT allowing to make the same such evaluation could be undertaken while the viewer is watching and thereby building up the profile.

In more general terms one or more profiles may be associated with one or more users of a reception apparatus or with a CAM, the profile being built based on viewing habits of the concerned user. The profile can then be used to select which content to use as alternative content in the context of an embodiment of the present invention or as a repeatable event in terms of another embodiment of the present invention, such selection thereby being targeted to the particular viewer. Similarly, the profile can be used in a management policy for the storage medium of embodiments of the present invention, whereby the profile is used to determine which content will be stored on the storage medium to be used as alternative content or repeatable content or to determine which content should be removed from the storage medium, based on evolution in profile, rendering some content less interesting to the viewer. However, other means may equally be employed for determining which content should be removed from the storage medium, such as statistical analysis based on the number of times a particular content is watched or simply by the date associated with a particular content, for example. Content can be compared with the profile in order to determine whether or not the content is of interest to the viewer having that profile. Information associated with the content, useful in determining whether or not it matches a profile is known as a content description. Various techniques are known within the industry to associate a content description with a piece of content. For example, a content description may be included in a header associated with the content or may be comprised in an ECM associated with the content.

Automatic profiling of the nature described above may be done without soliciting any particular intervention from the user. It may not even require the viewer to identify himself, and therefore the profile becomes associated with the viewing apparatus rather than a particular viewer, although if large variations in profiles between a plurality of users is detected, it may become possible to deduce that different viewers have been viewing content.

Other useful information in forming a profile is to note which types of programmes the viewer actively switches towards and continues to view, and which programmes the viewer actively switches away from. This is a way to compile a table of likes and dislikes for example.

The implementation of the section to be replaced by the alternative contents can be made according to several manners, depending on whether the contents are the same length or not. In case all the contents 30, 30' are the same length, the substituting of one or more contents 30 by alternative contents 30' does not cause particular problems. However, if the content lengths values are unequal, then it is suitable to combine alternative contents of different lengths which can be arranged within the length of the section.

On the basis of available alternative contents 30' stored in the alternative content memory 19, a process could be dedicated to search at least one combination whose the sum of the content length values of the alternative contents 30' is either equal to the length of the section S1, S2, S3 to substitute or introduces a difference with respect to this length. Preferably, any difference will be the smallest possible. To avoid any black frame in the alternative section to be displayed, such a difference will be compensated by adding an alternative content having a still picture, in cases of the length of the section to substitute is longer than the aforementioned sum. In the event this length is slightly longer, the difference could be compensated by extending at least one of the alternative content. Such an extension could be obtained for instance by lengthening the duration of each video image of the content and by synchronizing the sound in the same way.

On the contrary, if the length of the section S1, S2, S3 to substitute is slightly shorter than this sum, the difference could be compensated by compressing at least one of the alternative content. Such a compression could be obtained for instance by reducing the video frame rate and by slightly increasing the speed of the sound, so as to keep the synchronism between the image and the sound.

The index value of the switching information 24 could be also an ECM identifier, for instance a packet identifier pertaining to the ECM 21. Besides, the section length value may be included in this ECM identifier.

In the same way, the content length value and/or the personal identifier associated to each content may be included into the content identifier which allows a classification according to the nature.

In another embodiment, the switching information 24 comprises, or further comprises, a list of content identifiers to be displayed/played.

According to a preferred embodiment, part of the aforementioned contents is advertising, as well as the alternative content 30' pre-stored in the alternative content memory 19. Moreover, it should be noted that advertisement content can be either free access content or scrambled content.

In cases of the alternative content memory 19 comprises advertising, it would suitable to lock the access to this memory in order to prevent any reload with contents chosen by the user. In other words, the alternative content memory is accessible by the system but not directly addressable by the user. All or part of the information stored in the alternative content memory may be changed over the air. One way to acquire new alternative content is to check the input transport stream for content suitable for using as alternative content to see if that content is already stored in the alternative content memory or not. In the case that it is not, then it is stored, under control of the conditional access module, in the alternative content memory. Such content may also be played as it is stored. A profile, as previously mentioned, may further be used in deciding whether or not such content should be stored, resulting in the alternative content memory holding alternative content deemed to be of interest to the viewer.

Advantageously, by using a common interface hosting the conditional access module, the latter becomes independent from any device and the system can therefore easily be implemented in many different devices. In such cases, the storage medium may either be a protected area within the CAM or even in the security module or it can be anywhere else in the receiver but with access to the storage medium being controlled by the CAM.

If the common interface or the CAM has some messaging functionalities, some interactivity can be launched to the paying device relative to the current played/displayed content. For example, if it can trigger an HTML banner or a link, that banner or link can be displayed with the content to allow interactive actions.

The present invention also relates to a user unit 10 for performing the above-mentioned method, namely a device for processing a broadcast content stream 3 aiming to substitute a section S1, S2, S3 of this stream comprising at least one broadcast content 30 with at least an alternative content 30' to be played/displayed, for instance on a display unit 40. To this end, the user unit 10 comprises:

a conditional access module 11 for processing said broadcast content stream 3 with incoming control messages 21 associated to said broadcast content 30 and for outputting the processed content to an output 12, and an alternative content memory 19 to pre-store said alternative content 30', said conditional access module 11 comprising receiving means for receiving at least a broadcast content 30 together with at least a control message 20, 21, checking means for checking if said control message 21 comprises a switching information 24 and for checking if said switching information 24 has a positive characteristic, and a switching unit 18 for switching the output 12 of the conditional access module 11 to the pre-stored alternative content 30' and conversely.

The user unit 10 can further comprises a counter whose value is used for defining whether the switching information 24 is recognized as being positive or negative depending on at least one predefined threshold value.

Further, the user unit 10 may comprise a timer which is able to read a time indicator comprised within the switching information 24. Owing to this time indicator, this timer is then able to indicate when the switching unit 18, which outputs the alternative content 30', should start and/or stop.

Further, the user unit 10 may comprise a sizing means which is able to read a section length value comprised within the switching information 24 for determining the size or the duration of the section which has to be substituted.

Further, the user unit 10 may comprise processing means for determining, according to the section length value and/or to the content length values of the contents 30, 30', at least one alternative content 30' which has to replace the broadcast content 30. It is worth noting that although FIG. 1 shows the display device as being separate from the user unit, it is also possible for the display device, otherwise known as the presentation module (DISP) to be comprised within the user unit, especially if the user unit were a media player (MP) comprising the receiver (RX), the decryption module (DECR) and the event memory (MEM). In FIG. 2 the decryption module for decrypting the encrypted tag is shown. The media player may further comprise a conditional access module to store access rights and encryption/decryption keys, such keys being passed to the decryption module should the conditional access module have the necessary rights to be able to decrypt the tag. The conditional access module may be any of the known types such as a removable card or chip and may comply with any of the known standards such as the common interface (CI) standard. The conditional access module may also handle the usual conditional access processing known in the industry in order to allow protected content to be viewed, such as processing of EMMs and ECMs to allow control words (CW) to be extracted from the transport stream.

The invention claimed is:

1. A method for processing a multimedia transport stream including content of a first type, content of a second type, and metadata comprising switching information associated with at least one alternative content, said method being executed on a media processing device comprising a storage device for storing the alternative content, a conditional access module, and a transmission module to transmit a modified multimedia transport stream, the method comprising:
 processing the switching information using the conditional access module of the media processing device;
 substituting content of the second type by removing the content of the second type and inserting at least part of the alternative content based on the switching information, thereby creating the modified multimedia transport stream; and
 after the substituting,
  comparing a viewer profile and a content description associated with the removed content of the second type; and
  based on the comparison of the viewer profile and the content description of the removed content of the second type, determining whether to access a server to download the content of the second type in the storage device.

2. The method according to claim 1, wherein the substituting of the content of the second type by the alternative content includes:
 selecting the alternative content based on a comparison between a viewer profile and a content description associated with the alternative content.

3. The method according to claim 1, wherein
 each alternative content is associated with a unique identifier and the metadata is a piece of program specific information, and the switching information is an encrypted tag, the encrypted tag comprising a unique identifier of the content of the second type, the method further comprising:
 decrypting the encrypted tag using the conditional access module to get the unique identifier of the content of the second type; and
 selecting the alternative content whose unique identifier matches the unique identifier of the content of the second type.

4. The method according to claim 3, wherein the encrypted tag further comprises a flag, the flag indicating that a content immediately following the content of the first type is the content of the second type, the method further comprising replacing the content of the second type by the selected alternative content.

5. The method according to claim 3, wherein the encrypted tag further comprises:
 a flag, the flag indicating that a content following the content of the first type is a content of the second type; and
 a repeat index indicating a time when the content of the second type is to be presented;
 the method further comprising replacing the content of the second type by the selected alternative content at the time indicated by the repeat index.

6. The method according to claim 1, wherein the metadata is an electronic control message comprising the switching information.

7. The method according to claim/wherein the switching information comprises a release command, the method further comprising terminating the substituting of the content of the second type.

8. A media processing device for processing a multimedia transport stream, the media processing device comprising:
 a storage medium for storing at least one alternative content;
 an input for receiving the multimedia transport stream from a content source, the multimedia transport stream comprising content of a first type, content of a second type having a unique identifier, and metadata comprising switching information associated with the alternative content;
 a conditional access module; and
 a transmission module to transmit a modified multimedia transport stream;
 wherein said media processing device is configured to perform the method according to claim 1.

9. A media processing device for processing a multimedia transport stream, the media processing device comprising:
 a storage medium for storing at least one alternative content;
 an input for receiving the multimedia transport stream from a content source, the multimedia transport stream comprising content of a first type, content of a second type having a unique identifier, and metadata comprising switching information associated with the alternative content;
 a conditional access module; and
 a transmission module to transmit a modified multimedia transport stream;
 wherein said media processing device is configured to perform the method according to claim 2.

10. A media processing device for processing a multimedia transport stream, the media processing device comprising:

a storage medium for storing at least one alternative content;
an input for receiving the multimedia transport stream from a content source, the multimedia transport stream comprising content of a first type, content of a second type having a unique identifier, and metadata comprising switching information associated with the alternative content;
a conditional access module; and
a transmission module to transmit a modified multimedia transport stream;
wherein said media processing device is configured to perform the method according to claim 3.

11. A media processing device for processing a multimedia transport stream, the media processing device comprising:
a storage medium for storing at least one alternative content;
an input for receiving the multimedia transport stream from a content source, the multimedia transport stream comprising content of a first type, content of a second type having a unique identifier, and metadata comprising switching information associated with the alternative content;
a conditional access module; and
a transmission module to transmit a modified multimedia transport stream;
wherein said media processing device is configured to perform the method according to claim 4.

12. A media processing device for processing a multimedia transport stream, the media processing device comprising:
a storage medium for storing at least one alternative content;
an input for receiving the multimedia transport stream from a content source, the multimedia transport stream comprising content of a first type, content of a second type having a unique identifier, and metadata comprising switching information associated with the alternative content;
a conditional access module; and
a transmission module to transmit a modified multimedia transport stream;
wherein said media processing device is configured to perform the method according to claim 5.

13. A media processing device for processing a multimedia transport stream, the media processing device comprising:
a storage medium for storing at least one alternative content;
an input for receiving the multimedia transport stream from a content source, the multimedia transport stream comprising content of a first type, content of a second type having a unique identifier, and metadata comprising switching information associated with the alternative content;
a conditional access module; and
a transmission module to transmit a modified multimedia transport stream;
wherein said media processing device is configured to perform the method according to claim 6.

14. A media processing device for processing a multimedia transport stream, the media processing device comprising:
a storage medium for storing at least one alternative content;
an input for receiving the multimedia transport stream from a content source, the multimedia transport stream comprising content of a first type, content of a second type having a unique identifier, and metadata comprising switching information associated with the alternative content;
a conditional access module; and
a transmission module to transmit a modified multimedia transport stream;
wherein said media processing device is configured to perform the method according to claim 7.

15. The method according to claim 1, wherein access to the storage device is locked to prevent any reloading.

\* \* \* \* \*